May 16, 1950          H. O. SCHJOLIN          2,507,999
FLEXIBLE COUPLING
Filed June 9, 1947          2 Sheets-Sheet 1
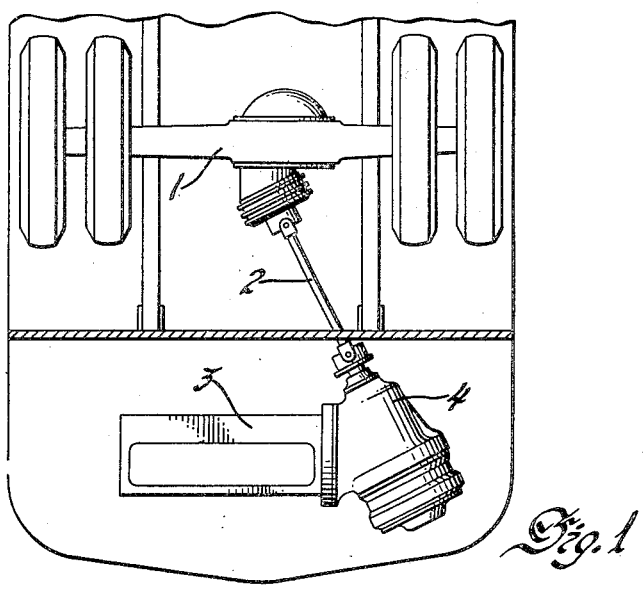
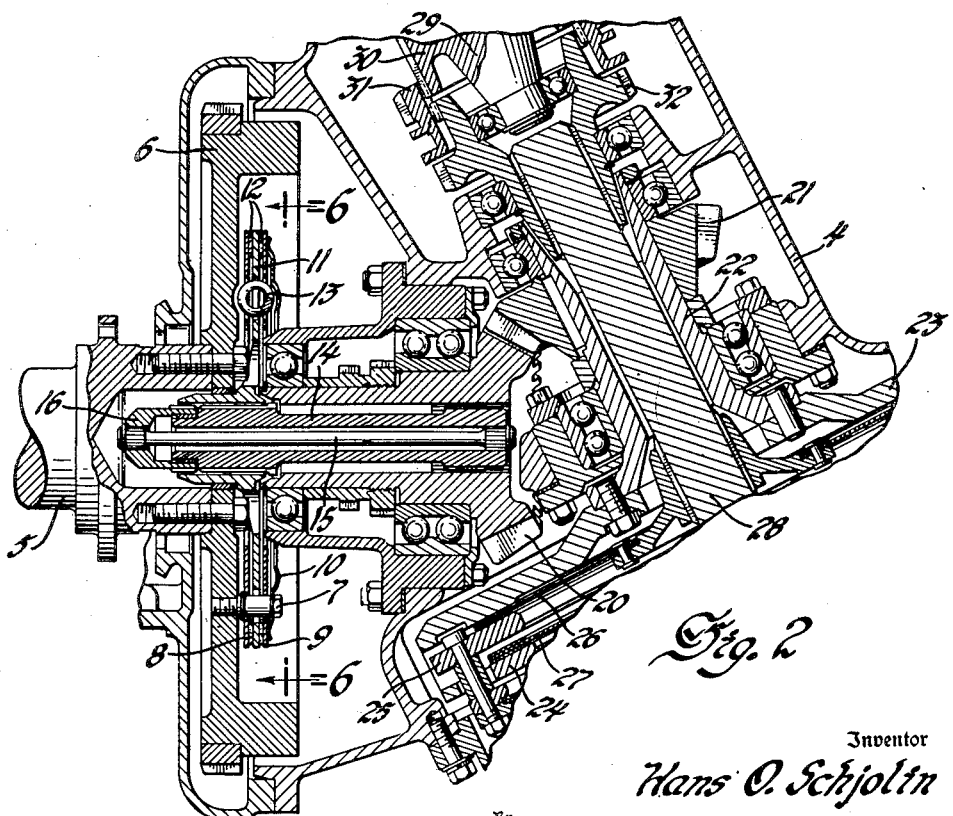
Inventor
Hans O. Schjolin
Attorneys May 16, 1950 H. O. SCHJOLIN 2,507,999
FLEXIBLE COUPLING
Filed June 9, 1947 2 Sheets-Sheet 2

Inventor
Hans O. Schjolin
Spencer, Willets, Helmig & Baillio
Attorneys

Patented May 16, 1950

2,507,999

UNITED STATES PATENT OFFICE 2,507,999

FLEXIBLE COUPLING

Hans O. Schjolin, Oakland, Mich., assignor to General Motors Corporation, Detroit, Mich., a corporation of Delaware Application June 9, 1947, Serial No. 753,543

10 Claims. (Cl. 192—3.5)

Diesel engines have long been satisfactorily used for constant speed installations but their adaptation for uses in which operating speeds and power torque are almost constantly varied has been retarded due at least in part to an inherent engine roughness. Recent changes in engine design have successfully overcome much of the violence of torque irregularities and have made Diesel power feasible and popular for certain limited types of variable speed operation as, for example, in large road vehicles. Nevertheless, Diesels are rough by comparison to other types of power plants and a smoothing out of the impulses through the power transmitting train as much as possible is of importance, especially for passenger comfort in buses and for a lessened fatigue to both passengers and the power driven parts.

In the interests of minimizing power plant space requirements and of rendering operating mechanism more accessible for servicing it is proposed to arrange a change speed gearing and power release clutch as a unit at an angle to the power delivery shaft of an engine disposed transversely and behind the rear drive axle, whose differential mechanism is joined to the output end of the angularly disposed change speed and clutch unit. This necessitates a set of bevel gears to connect the engine clutch with the engine crankshaft and conveniently enables the placement of an intermediate flexible coupling arrangement to smooth out engine torque vibration ahead of the bevel gears and the clutch and change speed unit.

As will be more fully described the flexible coupling here proposed includes a spring centered frictional slip joint which is amply effective under heavy load transmission and also a highly torsionally elastic shaft, whose transmission of load is limited to low torque and idling speed drive only and whose flexibility responds to torque vibration for reducing the transmission of the same and which otherwise would cause disturbing clatter of the lightly loaded bevel gear teeth, especially when the clutch beyond the gears is released.

Figure 3:
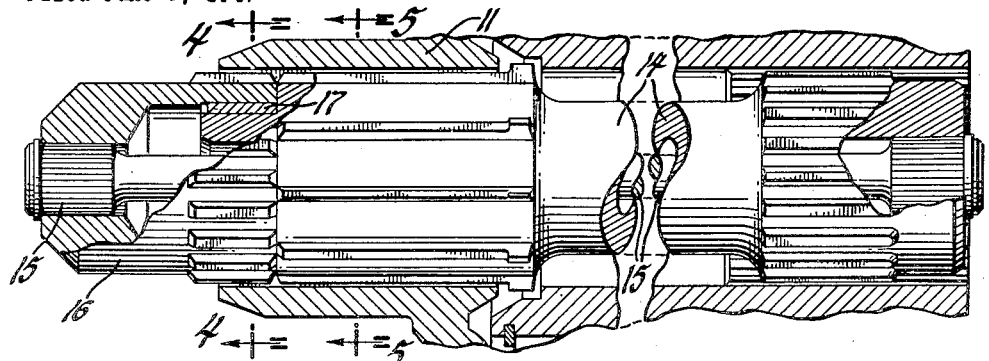
Figure 4:
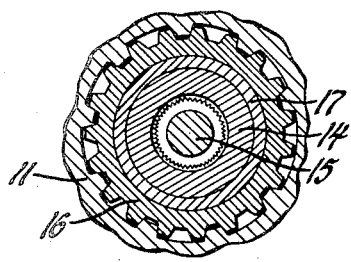
Figure 5:
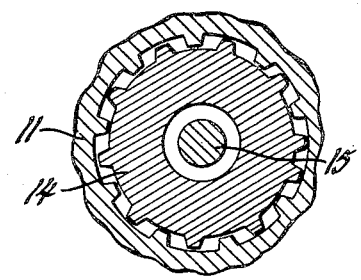
Figure 6:
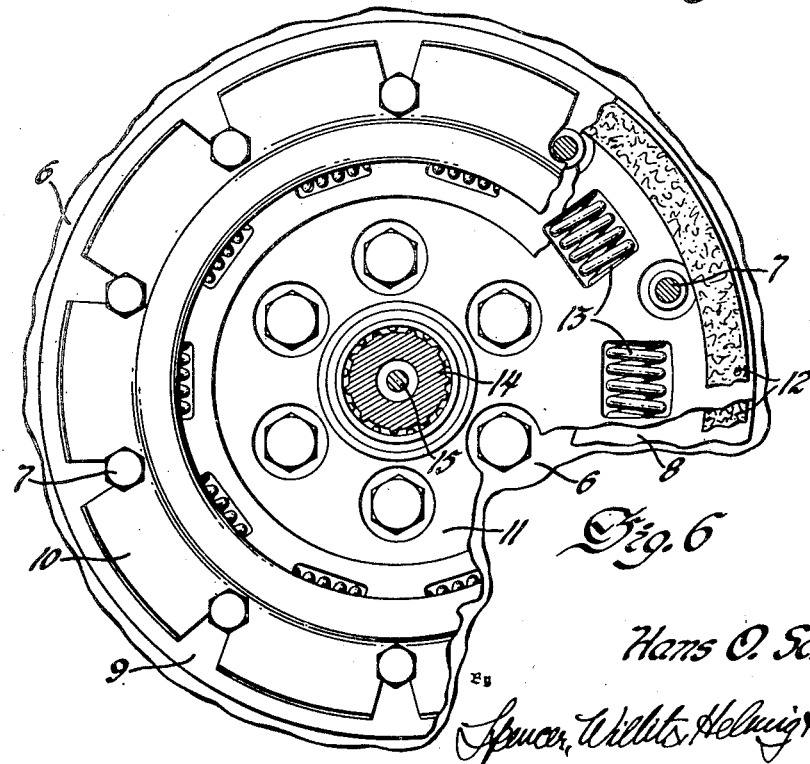

Referring to the accompanying drawing illustrating a preferred embodiment of the invention, Figure 1 is a plan view to illustrate the type of power plant installation here involved; Figure 2 is a horizontal sectional view of a portion of the angle drive power transmitting train; Figure 3 shows in longitudinal section a pair of companion drive shafts through which power is delivered to the bevel gears; Figures 4 and 5 are transverse sections taken on lines 4—4 and 5—5, respectively, of Figure 3 and Figure 6 is a section taken on line 6—6 of Figure 2 with parts broken away.

In Figure 1 the rear portion of a motor coach is indicated as being spring supported upon the conventional drive axle assembly 1 including differential mechanism between the road wheels to be driven by a diagonally disposed propeller shaft 2 from the output end of a power source, such as a transversely disposed Diesel engine 3, together with change speed gearing including a releasable clutch contained within the housing 4 disposed in line with the propeller shaft 2 and at an angle to the axis of the engine drive shaft. Bolted to the engine crankshaft 5 is a flywheel 6 carrying a series of circumferentially spaced mounting studs 7 for carrying a pair of spaced driving disks 8 and 9 of a flexible coupling unit. Stop shoulders conveniently formed on spacer sleeves carried by the studs 7 form abutments for the driving disk 8 and between the head of each stud and the adjacent end of the spacer sleeve there is clamped an annular spring ring 10 peripherally slotted to straddle the several studs and forming a circumferential series of peripheral spring arms to bear on the outer face of the driving disk 9 to urge it toward the driving disk 8. Clamped between the driving disks 8 and 9 is a driven disk 11 with friction linings 12 therebetween for the transmission of drive with a slight slippage in the event of overloading. To accommodate such slippage enlarged openings are formed in the driven disk 11 for the passage of the mounting studs 7. A circumferential series of centering springs 13 are located within aligned openings in the three disks 8, 9 and 11 and bear at opposite ends against the end walls of the openings of all the disks. These springs are retained laterally on one side by the adjacent wall of the flywheel 6 and on the other side by the inner edge portion of the clamping ring 10. As will be obvious the seating of the several springs 10 will resiliently resist slippage between the disks and restore the disks to centered relation and otherwise assist in damping torsional vibration in the transmission of power from the engine.

Fitted to the interior splines in the hub of the driven disk 11 are a pair of externally splined end portions of a nested shaft subassembly including a relatively stiff outer shaft 14 and a relatively highly torsionally elastic inner shaft 15. The opposite ends of the inner shaft 15 are serrated, splined or otherwise formed for keyed or solid connection, one to the driven end of the rigid shaft 14 and the other to a coupling sleeve 16 which internally is fitted to a bearing ring 17 on the nose or pilot extension at the driving end of the rigid shaft 14 and which bearing permits a relative oscillation between the adjacent portions of the rigid shaft 14 and sleeve 16.

The external splines on the sleeve 16 fit closely or without any lost motion to the internal splines in the hub of the driven disk 11. On the other hand the external splines on the forward end of the rigid shaft 14 are fitted to the internal splined disk 11 so as to leave considerable space for a lost motion driving connection. In other words, the space between the tooth formations of both the internal splines of the driven disk 11 and the externally splined forward end of the rigid shaft 14 is greater than the tooth width. For convenience in manufacture the coupling sleeve 16 is formed with nineteen involute splines and instead of the same number of splines on the members 11 and 14 ten splines and nine splines, respectively, are omitted and in assembling the parts particular attention is given to the selection of a position for the sleeve 16 on the serrations of the shaft or rod 15 so that the external splines on the sleeve 16 line up properly between the internal splines of the disk 11, as shown in Figure 4, whereby the shaft 15 is under no initial torsional deflection for positioning the splines of the disk 11 and shaft 14 in the centered lost motion relation illustrated in Figure 5. Thus in transmitting light loads through the elastic shaft 15 the rigid shaft 14 is precluded from carrying any of the load because of the clearance or lash between its driven splines in relation to the driving teeth on the hub of the disk 11. As the load increases the shaft 15 is torsionally deflected until the clearance space is taken up to limit further torsional deflection of the light shaft and thereafter the drive will be through the heavy shaft.

Mounted in suitable bearings in the casing 4 is a driving bevel gear 20 which surrounds the companion shafts 14 and 15 and is internally splined or otherwise fixedly keyed to the end of the shaft 14 having solidly fixed thereto the driven end of the flexible shaft 15. The driving gear 20 is in constant mesh with a driven gear 21 keyed to a sleeve 22 rotatably supported by suitable bearings in the housing 4 and fastened to a flywheel or clutching element 23 to which is fixed in spaced relation a cover plate 24. Interposed between the clutch driving members 23 and 24 are a shiftable cooperating clutch release plate 25 and a pair of friction drive disks 26 and 27. As will be obvious the movement of the shifter plate 25 in a direction toward the driving member 23 will clamp the driven clutch 26 in clutch driving relation while the movement of the shifter plate 25 in the opposite direction will clamp the driven clutch disk 27 in clutch engaged relation to the driving plate 24 for the selective drive through either plate. The driven clutch plate 26 is keyed or splined directly to a power transmission shaft 28 while the companion clutch disk 27 is arranged to drive a change speed transmission, not shown in detail and which may be of any well known type involving either shiftable reduction gears or a torque converter drive. The output end of the change speed transmission is also rigidly secured to the drive shaft 28 so that the shaft is driven either directly or through the change speed mechanism, depending upon selective engagement of the clutch plates 26 and 27. At its opposite end the shaft 28 is operatively joined to the propeller shaft. In the arrangement illustrated the propeller shaft is universally jointed to an output stub shaft 29 carrying a splined head 30 on which is slidably splined a gear shifter ring 31 which is shiftable into and out of engagement with jaw teeth on the end of a gear 32 keyed to the shaft 28. Reversing gearing is arranged to be driven by the gear 32 and to be engaged by the gear teeth of the shiftable sleeve 31 when the latter is shifted out of clutched engagement with the jaw teeth on the end of the gear 32.

From the above description it will be apparent that there has been provided a means to eliminate engine torque vibration and gear clatter and in which a flexible coupling operates to carry full engine torque as well as to absorb shock loads and that additionally there is provided an extremely flexible link to eliminate gear clatter at low torque and idling speed. The latter is so designed and selected as to possess considerable angular displacement sufficient to prevent the passage into the gears of changes in angular velocity of the crankshaft resulting from firing impulses as well as misfiring. A maximum relative rotation of 9° in either direction between the stiff shaft 14 and the hub of the flexible coupling disk 11 has been found suitable as a limit to torsional deflection of the bar 15. Thus when the throttle is opened the low torque bar can be twisted 9° but it will be stressed no higher because at this point the lost motion will be taken up and the driving splines of the flexible joint will pick up the splined teeth on the rigid shaft and drive directly to the angle gearing with the coil springs 13 and the slip joint between the plates 8, 9 and 11 providing desired flexibility in the drive train.

I claim:

1. In a drive connection between an engine and a releasable clutch whose axis is angularly disposed in relation to the axis of the engine drive shaft, a pair of constant mesh bevel gears comprising a driving gear element and a driven gear element joined to the clutch, a flexible coupling having a driven element and a driving element joined to the engine shaft, and a pair of drive transmitting shafts joining the driven element of the flexible coupling with the driving gear element, both shafts being solidly drive connected at one end to one of the elements, one of the shafts being solidly drive connected at the other end with the other element and the other shaft at its other end being splined to the other element with a clearance lash to afford a lost motion which must be taken up for drive therethrough after torsional deflection of the companion shaft.

2. In a drive transmission of the character described, a releasable clutch, a driven gear operatively connected with the clutch, a driving gear element in constant mesh with said driven gear, an engine driven element and means to couple said elements including, a first shaft solidly joined at opposite ends to the driving gear element and an engine driven element and a second shaft solidly joined at one end to one of said elements and loosely splined with a clearance lash to the other element to preclude drive therethrough except after predetermined torsional deflection of the first shaft.

3. In combination with an engine, a clutch for transmitting drive from the engine and a pair of constant mesh gears interposed between the clutch and the engine, of means for transmitting engine drive to said gears and for reducing gear clatter at low torque and idle speed, including a pair of companion shafts, both having drive connections at opposite ends with the engine and the gears, one having solid drive connections at opposite ends but being relatively highly elastic to torsional deflection and the other being relatively stiff to torsional deflection and having a solid drive connection at one end and a loose fitted drive connection at the other end affording play clearance to compel drive transmission through the elastic shaft within the limit of its torsional deflection as defined by play take up in said loose fitted drive connection.

4. In a power transmitting drive to a releasable clutch which couples a power source to mechanism to be driven, a set of constant mesh gears in the drive train from the power source to the clutch one of which gears is a driving gear and another of which is a driven gear, a cushioned coupling between one of the gears and the power source, including a friction drive joint having driving and driven elements and centering springs to transmit drive between said elements and serving to smooth out heavier torsional impulses, a pair of drive shafts both connected to both the driven element of the joint and the driving gear, one of the shafts being relatively stiff torsionally but having lost motion in one of its connections and the other shaft being relatively torsionally elastic and arranged to resist the take up of said lost motion and transmit light load to the gears with a cushioning of the lighter torsional impulses from the power source.

5. In a power transmitting drive to a releasable clutch which couples a power source to mechanism to be driven, a set of constant mesh gears including driving and driven gears between the clutch and the power source, a cushioned coupling between one of the gears and the power source, including a friction drive joint having driving and driven elements and centering springs therebetween and serving to smooth out heavier torsional impulses, a lost motion drive connection between the driven element of the joint and the driving gear and elastic means yieldingly resisting the take up of lost motion.

6. In combination a releasable clutch, a power source, a set of constant mesh gears through which the clutch is driven from the power source, a first power transmitting device joining the gears to the power source and having a lost motion connection therein which precludes drive therethrough until after the lost motion is taken up, and a second power transmitting device by-passing the first device and having a yielding elasticity which enables transmission of engine idle load through the gears but which yields readily within the limit of said lost motion and is too elastic to carry heavy load.

7. In combination, a source of power, a releasable clutch controlling transmission of power from said source, a set of constant mesh gears in the drive connection from the power source to said clutch, and a cushion coupling cooperating with said gears and comprising a torsionally yieldable joint having a relatively high resistance to torsion drag, and a pair of drive transmitting elements, one being relatively highly torsionally elastic and incapable by itself of carrying engaged clutch load and the other being relatively highly torsionally inelastic to carry the engaged clutch load and having a lost motion drive connection so arranged to enable drive through the elastic element under clutch release load and to define a limit to torsional deflection of said elastic element, said elastic element and the yielding joint serving to smooth out torsional vibration from the power source, said yielding joint acting when said inelastic element is transmitting drive and said elastic element acting when it alone is transmitting drive and the reaction load is too light to bring the yielding joint into action.

8. Power drive means including a power source, a releasable clutch therefor, a pair of constant mesh gears for driving the clutch, a pair of drive transmitting connections between the power source and said gears, arranged in parallel drive relation, one of said connections having a small rotative lost motion therein but being otherwise substantially rigid torsionally and the other being torsionally elastic and operative under idle load to maintain the lost motion non-drive relation of said otherwise torsionally rigid connection.

9. Power drive means including a power source, a releasable clutch therefor, a pair of constant mesh gears for driving the clutch, a torsionally elastic drive shaft having fixed drive connections at opposite ends with the gears and said power source, substantially inelastic drive means joining the gears and power source in parallel relation to said shaft and having a lost motion joint therein which enables drive transmission through the elastic shaft at power source idle load but is taken up for heavy drive load transmission through the clutch.

10. In a drive connection between a power source and a releasable clutch therefor, a pair of constant mesh gears, a drive transmitting torsionally yieldable coupling, a non-yieldable connection between the coupling and said gears embodying a limited lost motion therein arranged to be taken up completely and to be effective under clutch engaged heavy driving load and a highly elastic connection in parallel with and operative within the limit of the lost motion embodied in said non-yielding connection for the transmission of drive through said gears and to the clutch driving element when the load is light.

HANS O. SCHJOLIN.

REFERENCES CITED

The following references are of record in the file of this patent:

UNITED STATES PATENTS

| Number | Name | Date |
|---|---|---|
| 993,570 | Webster | May 30, 1911 |
| 1,636,262 | Troendly | July 19, 1927 |
| 1,934,191 | Hoffman | Nov. 7, 1933 |
| 1,961,679 | Walti | June 5, 1934 |
| 2,435,930 | Schjolin | Feb. 10, 1948 |